(12) United States Patent
Wycech

(10) Patent No.: US 6,270,600 B1
(45) Date of Patent: *Aug. 7, 2001

(54) REINFORCED CHANNEL-SHAPED STRUCTURAL MEMBER METHODS

(75) Inventor: Joseph S Wycech, Grosse Pointe Woods, MI (US)

(73) Assignee: Henkel Corporation, Gulph Mills, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,803

(22) Filed: Feb. 2, 1999

Related U.S. Application Data

(63) Continuation-in-part of application No. 08/675,173, filed on Jul. 3, 1996, now Pat. No. 5,888,600.

(51) Int. Cl.[7] .............................. B32B 5/18; B32B 31/14; B29D 22/00
(52) U.S. Cl. .................. 156/79; 428/35.9; 428/36.5; 428/358; 428/613
(58) Field of Search ............. 156/79; 428/36.5, 428/35.9, 358, 613

(56) References Cited

U.S. PATENT DOCUMENTS

| | | | |
|---|---|---|---|
| Re. 36,323 | 10/1999 | Thompson et al. | 181/286 |
| 3,665,968 | 5/1972 | DePutter | 138/141 |
| 4,082,825 * | 4/1978 | Putterbaugh | 264/46.5 |
| 4,751,249 | 6/1988 | Wycech | 521/54 |
| 4,762,352 * | 8/1988 | Enomoto | 293/120 |
| 4,810,548 | 3/1989 | Ligon, Sr. et al. | 428/71 |
| 4,874,650 | 10/1989 | Kitoh et al. | 428/68 |
| 4,898,630 | 2/1990 | Kitoh et al. | 156/79 |
| 4,901,500 | 2/1990 | Wycech | 52/793 |
| 4,908,930 | 3/1990 | Wycech | 29/529.2 |
| 4,923,902 | 5/1990 | Wycech | 521/54 |
| 4,978,562 | 12/1990 | Wycech | 428/35.8 |
| 5,089,311 | 2/1992 | Ligon, Sr. | 428/71 |
| 5,124,186 | 6/1992 | Wycech | 428/35.8 |
| 5,213,391 | 5/1993 | Takagi | 296/205 |
| 5,344,208 | 9/1994 | Bien et al. | 296/187 |
| 5,345,720 | 9/1994 | Illbruck et al. | 49/502 |
| 5,506,025 | 4/1996 | Otto et al. | 428/98 |
| 5,529,824 | 6/1996 | Walendy et al. | 428/75 |
| 5,575,526 | 11/1996 | Wycech | 428/36.5 |
| 5,631,027 | 5/1997 | Takabatake | 425/4 R |
| 5,642,914 | 7/1997 | Takabatake | 296/187 |
| 5,755,486 * | 5/1998 | Wycech | 296/188 |
| 5,806,915 | 9/1998 | Takabatake | 296/187 |
| 5,806,919 | 9/1998 | Davies | 296/205 |
| 5,880,600 * | 3/1999 | Wycech | 428/35.9 |
| 5,904,024 | 5/1999 | Miwa | 52/732.1 |
| 5,985,435 | 11/1999 | Czaplicki et al. | 428/323 |
| 6,003,274 * | 12/1999 | Wycech | 52/232 |
| 6,058,673 * | 5/2000 | Wycech | 52/721.4 |
| 6,062,624 | 5/2000 | Crabtree et al. | 296/39.3 |
| 6,068,424 * | 5/2000 | Wycech | 403/269 |
| 6,079,180 * | 6/2000 | Wycech | 52/731.6 |
| 6,093,358 | 7/2000 | Schiewe et al. | 264/250 |

FOREIGN PATENT DOCUMENTS

| | | |
|---|---|---|
| 3-118179 | 5/1991 | (JP) . |
| 7-031569 | 2/1995 | (JP) . |
| 10-236332 | 9/1998 | (JP) . |

* cited by examiner

*Primary Examiner*—Robert Dawson
*Assistant Examiner*—Jeffrey B. Robertson
(74) *Attorney, Agent, or Firm*—Wayne C. Jaeschke; Stephen D. Harper; Harold Pezzner

(57) ABSTRACT

A reinforced structural member has a channel-shaped laminate structure of a metal stamping, a channel-shaped foil and an intervening layer of structural foam. The reinforced structural member is formed by pressing a foil/resin preform into a channel and thermally expanding the resin to form a structural foam.

35 Claims, 4 Drawing Sheets

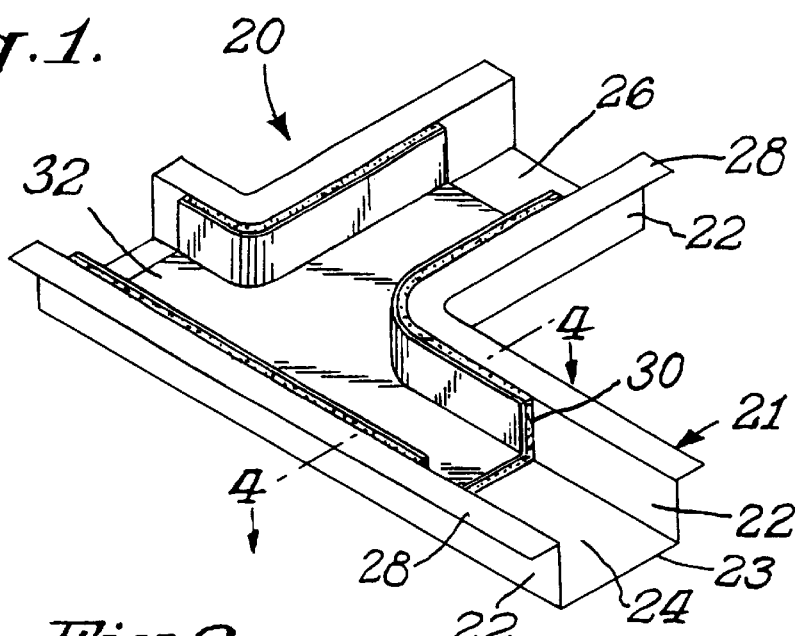
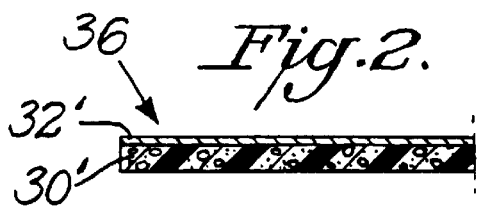
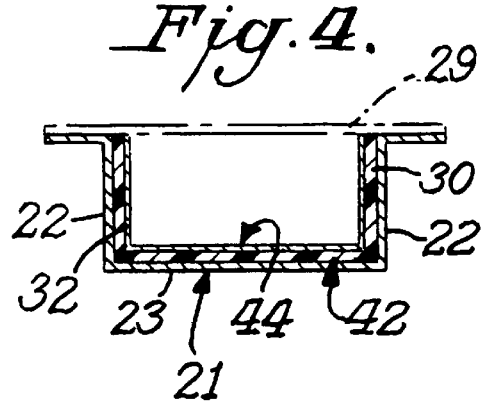
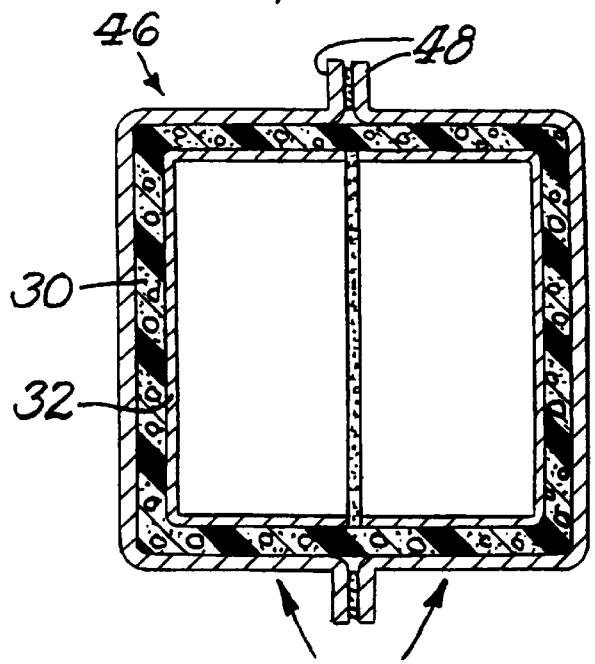

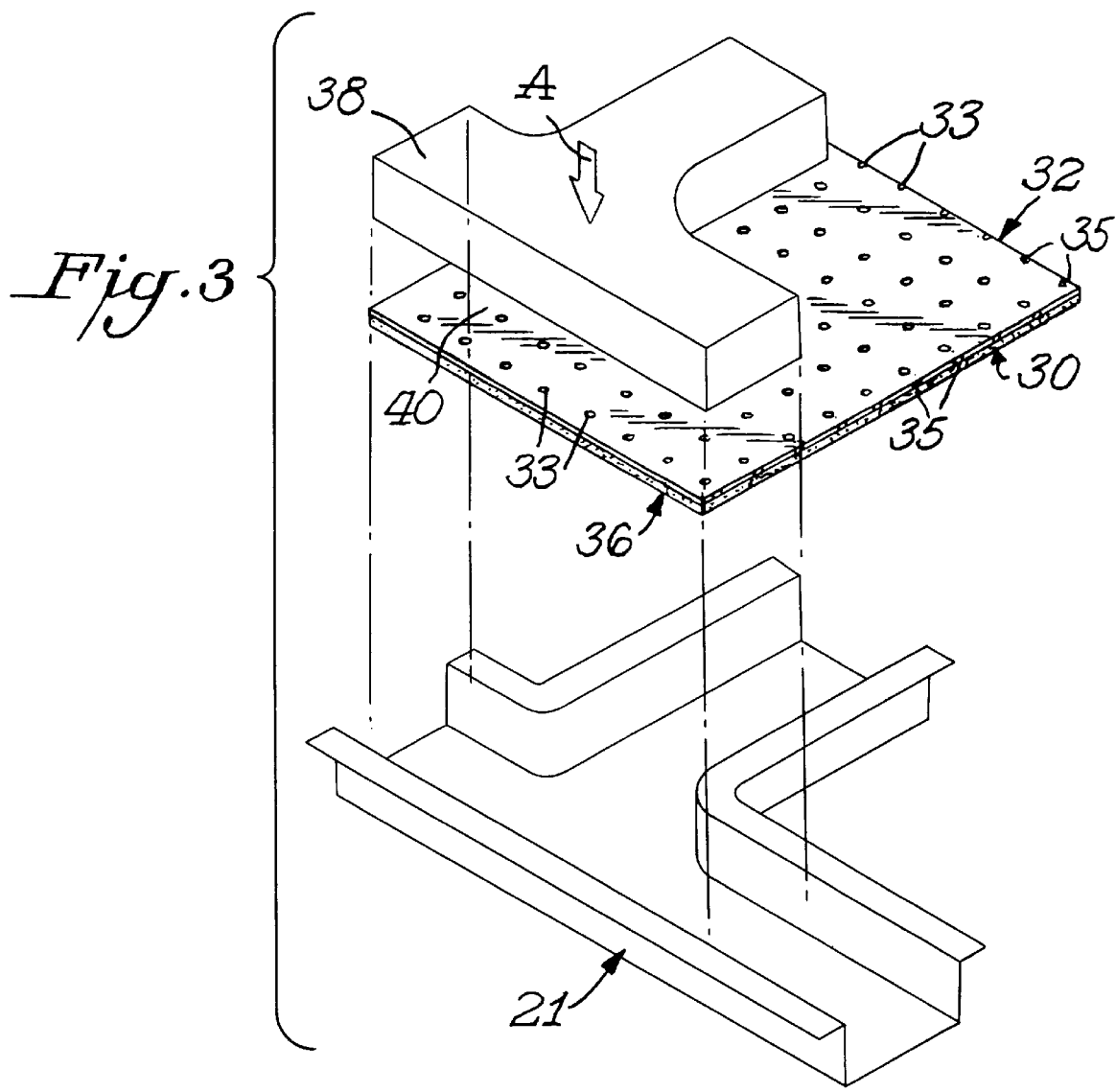

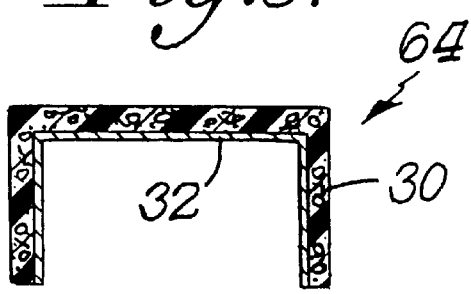
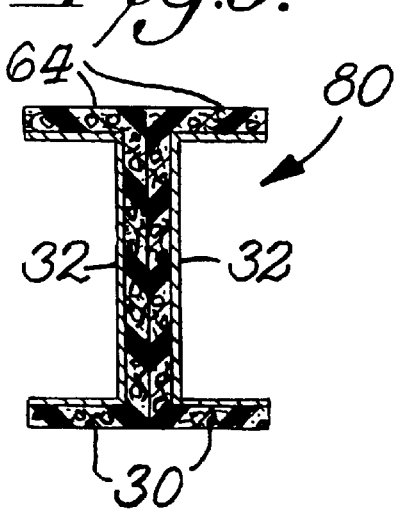
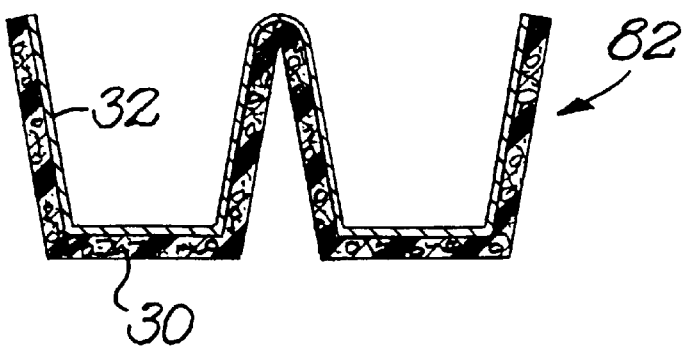

REINFORCED CHANNEL-SHAPED STRUCTURAL MEMBER METHODS

CROSS-REFERENCE TO RELATED APPLICATION

This application is a continuation in part of application Ser. No. 08/675,173, filed Jul. 3, 1996 now U.S. Pat. No. 5,888,600.

TECHNICAL FIELD

The present invention relates generally to methods and apparatus for reinforcing various structures and, more specifically, relates to reinforced channel-shaped members.

BACKGROUND OF THE INVENTION

In a number of applications, light-weight, high-strength structural members are required, for example in motor vehicles and aircraft as well as in various devices such as home appliances and the like. A number of composite materials have been proposed in the past as structural members, such as exotic light-weight alloys. In most applications, however, mass reduction must be balanced against the cost of the product to the consumer. Thus, there is a need for providing strength without significantly increasing materials and labor costs. Moreover, reinforcement techniques are needed which can be adapted to existing geometries of structural parts, obviating any requirement for fundamental design changes.

As examples of reinforcement techniques, the present inventor has disclosed a number of metal/plastic composite structures for use in reinforcing motor vehicles components. In U.S. Pat. No. 4,901,500, entitled "Light-weight Composite Beam," a reinforcing beam for a vehicle door is disclosed which comprises an open channel-shaped metal member having a longitudinal cavity which is filled with a thermoset or thermoplastic resin-based material. In U.S. Pat. No. 4,908,930, entitled, "Method of Making a Torsion Bar," a hollow torsion bar reinforced by a mixture of resin with filler is described. The tube is cut to length and charged with a resin-based material.

In U.S. Pat. No. 4,751,249, entitled, "Reinforcement Insert for a Structural Member with Method of Making and Using the Same," a precast reinforcement insert for structural members is provided which is formed of a plurality of pellets containing a thermoset resin with a blowing agent. The precast member is expanded and cured in place in the structural member. In U.S. Pat. No. 4,978,562, entitled, "Composite Tubular Door Beam Reinforced with a Syntactic Foam Core Localized at the Mid Span of the Tube," a composite door beam is described which has a resin based core that occupies not more than one-third of the bore of a metal tube.

In U.S. Pat. No. 5,575,526, entitled "Composite Laminate Beam for Automotive Body Construction," a hollow laminate beam characterized by high stiffness-to-mass ratio and having an outer portion which is separated from an inner tube by a thin layer of structural foam is described. In U.S. Pat. No. 5,755,486, a W-shaped carrier insert reinforcement which carries a foam body is described for use in reinforcing a hollow beam.

In U.S. patent application Ser. No. 08/644,389, filed May 10, 1996, entitled "INTERNAL REINFORCEMENT FOR HOLLOW STRUCTURAL ELEMENTS," now abandoned, the present inventor discloses an I-beam reinforcement member which includes an external foam layer. The I-beam, as in the case of most of the foregoing reinforcements, involves a preformed structural insert which is then inserted into a hollow structural member.

It is also known to increase strength of a laminate structure by bonding together flat metal plates using an intervening layer of resin. For example, it is known to form a metal laminate sheet for use as a floor panel member which comprises a pair of flat metal sheets having an intervening layer of asphalt or elastic polymer.

Although filling the entirety of a section with plastic foam does significantly increase section stiffness (at least when high-density foams are utilized), this technique also may significantly increase mass and thus part weight, which, as stated, is an undesirable feature in most applications. In addition, filling a section entirely with foam may be prohibitively expensive and creates a large heat sink. And, although increasing the metal gauge of a section or adding localized metal reinforcements will increase stiffness, as the metal thickness increases, it is more difficult to form the part due to limitations of metal forming machines.

Accordingly, it would be desirable to provide a low-cost technique for reinforcing a channel-shaped structural member without proportionately increasing the mass. It would also be desirable to provide a method of reinforcing an existing channel-shaped member which does not require any fundamental design changes to the member. The present invention provides channel-shaped members which have increased strength with moderate increases in mass and without the use of high volumes of expensive resins. The present invention further provides a method for reinforcing existing structural parts without redesigning the geometry of the part. It has been found that the present invention increases section stiffness and provides vibration dampening in channel-shaped sections in a highly efficient and reproducible manner.

SUMMARY OF THE INVENTION

In one aspect the present invention provides a reinforced channel-shaped member. The channel-shaped member is preferably a stamping or the like which defines a channel. The channel generally has a length which is greater than its width. The channel-shaped member is typically formed of metal or plastic. A layer of expanded structural foam is disposed in the channel. The shape of the structural foam matches that of the channel-shaped stamping; that is, the foam has one surface which is bonded to and conforms to the wall of the channel-shaped member defining the channel and another (opposed) surface which is itself channel-shaped. An insert is disposed and bonded to the layer of structural foam. The insert geometry mates with that of the structural foam. The insert is a metal foil or plastic and has a thickness of from 0.002 to 0.100 inch.

In another aspect two reinforced channel shaped members are formed and are then joined together to form a reinforced tube.

In still another aspect the present invention provides a method of reinforcing a structural part which includes the steps of forming a laminated structure having a layer of unexpanded, uncured foam-forming resin, and a layer comprising a metal or plastic carrier sheet; placing the laminate on a part having a non-planar geometry; conforming the laminate to the geometry of the non-planar part; and thermally expanding and bonding the resin to the part.

In one aspect the method of the present invention reinforces a channel-shaped structure through the steps of extruding a planar layer of thermally-expandable structural resin onto the surface of a release liner; placing a planar foil on the resin to form a foil/resin laminate having a release layer; die cutting the material to shape; removing the release liner; placing the foil/resin laminate over a channel-shaped structural member such that the resin layer is facing the part; pressing the foil/resin laminate structure into the channel such that the resin layer contacts the part in the channel; trimming away any excess foil/resin laminate from the part; and heating the part to thermally expand the thermally expandable resin and to securely bond the resin to the foil and to the channel-shaped member.

These and other advantages and objects of the present invention will now be more fully described with reference to the drawings.

BRIEF DESCRIPTION OF THE DRAWINGS

FIG. 1 is a perspective view of a reinforced channel member made in accordance with the present invention.

FIG. 2 is a cross section of a two layer foil/resin laminate used in the present invention.

FIG. 3 is an exploded view of the reinforced channel member of FIG. 1 in an intermediate stage of construction with the forming tool shown in position above the preform.

FIG. 4 is a cross section along lines 4—4 of FIG. 1.

FIG. 5 is a cross section of two reinforced channel shaped structures made in accordance with the present invention welded to together at their flanges to form a reinforced tube.

FIGS. 8–10 are cross-sectional end elevational views of alternative forms of laminates in accordance with this invention.

DETAILED DESCRIPTION OF THE PREFERRED EMBODIMENTS OF THE INVENTION

Figure 6:
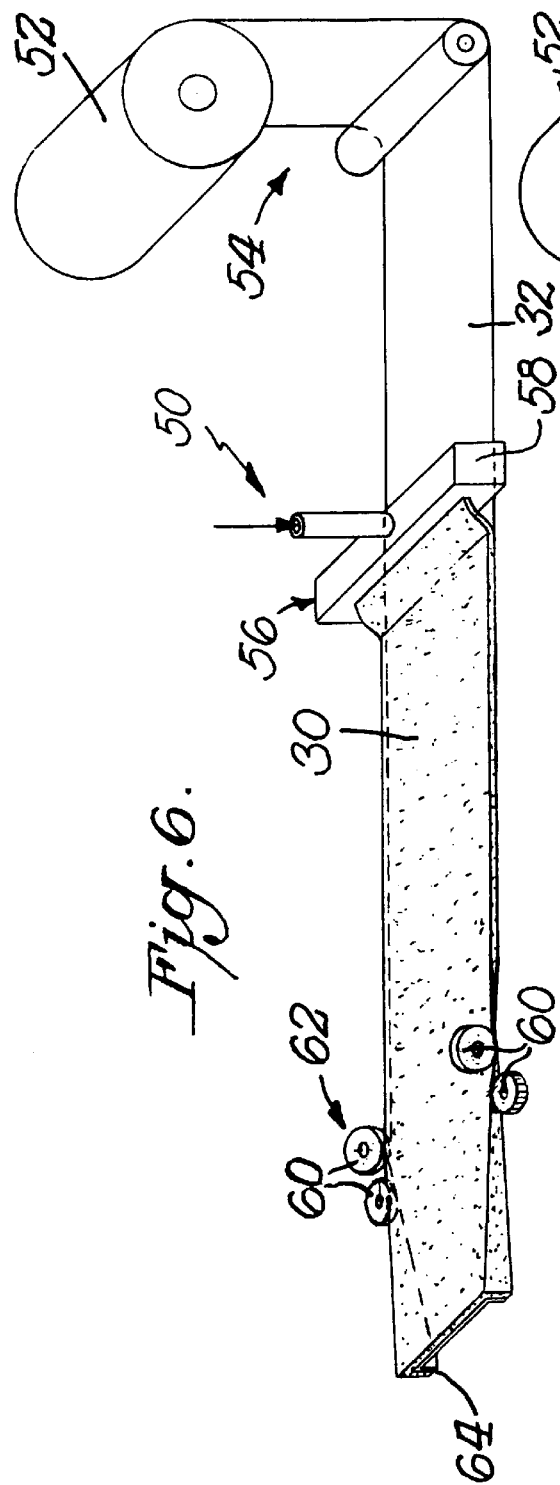
FIG. 6 is a schematic perspective view of an assembly for forming laminates in accordance with one practice of this invention.

Referring now to FIG. 1 of the drawings, reinforced structural part 20 is shown generally having stamping 21 with walls 22 and floor or bottom 23 which define channels 24 and 26. Flanges 28 are also seen which may receive a closure plate 29 shown in phantom in FIG. 4. Stamping 21 is preferably a metal stamping but could be formed by another metal forming technique such as casting or the like or could be formed of a material such as plastic, for example polycarbonate. The dimensions of stamping 21 may vary widely depending on the application. In the most preferred embodiment of the present invention, stamping 21 is a structural member, for example a radiator support structure, in a motor vehicle. Stamping 21 has a metal gauge or thickness of from about 0.030 to about 0.120 inch.

Still referring to FIG. 1 of the drawings, thermally expanded structural foam layer 30 is shown disposed on walls 22 and floor or bottom 23 in channels 24 and 26. Thermally expanded structural foam layer 30 is a structural foam that adds stiffness, strength, and vibration dampening characteristics to reinforced structural part 20. Thermally expanded structural foam layer 30 is expanded through the use of heat, as will be more fully described hereinafter and, in the expanded state depicted in FIG. 1, has a thickness of from about ⅛ inch to about ⅜ inch and more preferably has a thickness of from about 3/16 inch to about ¼ inch.

Inner reinforcement or foil 32 is seen disposed on thermally expanded structural foam layer 30 and comprises, in the most preferred embodiment, a steel foil, an aluminum foil or glass impregnated resin (Fiberglass), although it may be possible to utilize other materials in some applications. Inner reinforcement or foil 32 defines its own channel, as will be described more fully herein.

In the preferred embodiment, inner reinforcement or foil 32 is provided with a plurality of perforations 33 (shown only in FIG. 3) that define perforation channels 35 (shown in FIGS. 3 and 4). Perforations 33 serve the important function of allowing gas to escape through inner reinforcement or foil 32 as layer 30 thermally expands when heated. In the absence of perforations 33, thermally expanded structural foam layer 30 may not bond properly to stamping 21 due to the formation of gas pockets. Foil 32 may be in the foam of an open mesh structure which would still be capable of functioning as a carrier for foam layer 30. The open mesh structure would also provide the functioning of perforations 33.

Thermally expanded structural foam layer 30 preferably has a thickness of from about ⅛ inch to about ½ inch and more preferably, in automotive applications, a thickness of from about ¼ inch to ⅜ inch. In most applications, thermally expanded structural foam layer 30 will extend over the entire area of foil 32; that is, it will completely separate foil 32 from stamping 21.

One important aspect of the present invention is mass reduction in reinforced structural part 20. Also, as described in the forgoing background, resin is a relatively expensive component and thus resin reduction is a desirable goal. By providing conforming or nested formed-in-place channel-shaped structures as shown in FIG. 1, resin volume is reduced over a solid fill of resin and weight is reduced by using a reinforcing foil rather than a thick heavy metal, insert.

Referring now to FIG. 2 of the drawings, in accordance with the method of the present invention, laminate preform 36 is shown having thermally expandable structural resin layer 30' and inner reinforcement or foil 32' in the form of a two-layer laminate construction. The preferred method of forming laminate preform 36 is by extruding thermally expanded structural foam layer 30' onto a release paper such as a wax paper. The resin/release paper sheet is then ready to receive foil 32', i.e. foil 32' is placed on the resin side of the resin/release paper sheet. The resulting "tn-laminate" is then run through a pinch roller or the like to securely bond the resin to the foil. The procedure of forming the tn-laminate is preferably carried out using a conveyor or the like. The resin/release layer/foil sheet is then die cut to shape; the release liner is removed just prior to use. In this preferred process, thermally expandable structural resin layer 30' is at a temperature of about 100° F. to 150° F. as it is deposited on the liner.

Most preferably, foil 32' is perforated with an average of about 1 to about 2 perorations per square inch with each perforation having a diameter of about 1/16 inch to about 3/16 inch. The perforations are preformed in foil 32' prior to lamination to the resin sheet. Using the most preferred formulation for thermally expandable structural resin layer 30', laminate preform 36 can be used up to about ninety days after it is fabricated. As stated above, laminate preform 36 (unexpanded) has a thickness of from about ⅛ inch to about ¼ inch.

Referring now to FIG. 3 of the drawings, the preferred method of conforming laminate preform 36 to stamping 21 is through the use of forming tool 38 which is shown positioned above laminate preform 36 moving in the direction of arrow A. That is, forming tool 38 contacts principal surface 40 of preform 36 and presses laminate preform 36 into channels 24 and 26. It will be appreciated then that, in essence, structural foam channel 42 and foil channel 44 are formed as best seen in FIG. 4. As also best seen in FIG. 4, thermally expanded structural foam layer 30 and inner reinforcement or foil 32 are trimmed to below the top surface of stamping 21.

The invention may also be practiced where the preform 36 is initially shaped to conform to its intended channel shape and thus form a drop in insert. The drop in insert could then be manually placed in the structural part 20 by an assembly line worker, rather than being pressed into the structural part by forming tool 38.

In FIG. 5 of the drawings, two reinforced structural parts 20 are shown joined to form reinforced tube 46 with welded flanges 48. Thus, the present invention can also be used where tube applications are required.

A number of resin-based compositions can be utilized to form thermally expanded structural foam layer 30 in the present invention. The preferred compositions impart excellent strength and stiffness characteristics to reinforced structural part 20 while adding only marginally to the weight. With specific reference now to the composition of thermally expanded structural foam layer 30, the density of the material should preferably be from about 15 pounds per cubic feet to about 50 pounds per cubic feet to minimize weight. The melting point, heat distortion temperature and the temperature at which chemical breakdown occurs must also be sufficiently high such that thermally expanded structural foam layer 30 maintains it structure at high temperatures typically encountered in paint ovens and the like. Heat from a paint oven could be utilized to expand layer 30, rather than requiring a separate heating step not ordinarily used in vehicle manufacturing. Therefore, thermally expanded structural foam layer 30 should be able to withstand temperatures in excess of 140 degrees F. and preferably 350 degrees F. for short times without exhibiting substantial heat-induced distortion or degradation.

In more detail, in one particularly preferred embodiment thermally expanded structural foam layer 30 includes a synthetic resin, microspheres, a blowing agent and a filler. A synthetic resin comprises from about 40 percent to about 90 percent by weight, preferably from about 50 percent to about 80 percent by weight, and most preferably from about 50 percent to about 70 percent by weight of thermally expanded structural foam layer 30'. In the present invention, foam layer 30 has a cellular structure which provides a low-density, high-strength material, which, in reinforced structural part 20, provides a strong, yet lightweight structure. Microspheres which are compatible with the present invention include reinforcing "hollow" spheres or microbubbles which may be formed of either glass or plastic. Plastic microspheres may be either thermosetting or thermoplastic and either expanded or unexpanded. In one embodiment, unexpanded microspheres are used which are then expanded to form thermally expanded structural foam layer 30. The preferred microspheres are from about 10 to about 400 and preferably from about 20 to about 100 microns in diameter. The microspheres may also comprise a larger, lightweight material such as macrospheres of greater than 400 microns in diameter. Glass microspheres are particularly preferred. Also, a blowing agent is preferably included which may be either a chemical blowing agent or a physical blowing agent. The microsphere component constitutes from about 5 percent to about 50 percent by weight, preferably from about 10 percent to about 40 percent by weight, and most preferably from about 15 percent to about 40 percent by weight of the material which forms thermally expandable structural foam layer 30'. The blowing agent constitutes from about 1 percent to about 15 percent by weight, preferably from about 1 percent to about 10 percent by weight, and most preferably from about 1 percent to about 5 percent by weight of thermally expandable structural resin layer 30'. Suitable fillers include glass or plastic microspheres, silica fume, calcium carbonate, milled glass fiber, and chopped glass strand. Glass microspheres are particularly preferred. Other materials may be suitable. A filler comprises from about 1 percent to about 40 percent by weight, preferably from about 1 percent to about 30 percent by weight and most preferably from about 1 percent to about 20 percent by weight of thermally expandable structural resin layer 30'. Preferred synthetic resins for use in the present invention include thermosets such as epoxy resins, vinyl ester resins, thermoset polyester resins, and urethane resins. It is not intended that the scope of the present invention be limited by molecular weight of the resin. Where the resin component of the liquid filler material is a thermoset resin, various accelerators, such as "EMI-24" (imidazole accelerator) and "DMP-30," and curing agents, preferably organic peroxides such as "MEK" peroxide and "Percadox," may also be included to enhance the cure rate. A functional amount of accelerator is typically from about 0.1 percent to about 4.0 percent of the resin weight with a corresponding reduction in one of the other components. Effective amounts of processing aids, stabilizers, colorants, TJV absorbers and the like may also be included in layer. Thermoplastics may also be suitable.

The following tables show preferred formulations for thermally expandable structural foam layer 30'. It has been found that these formulations provide a thermally expanded structural foam layer which fully expands and cures at about 320° F. and provides a reinforced structural part 20 having excellent structural properties. All percentages in the present disclosure are percent by weight unless otherwise specifically designated.

| INGREDIENT | BY WEIGHT |
|---|---|
| FORMULA I | |
| Polyester Resin ("ARS-137-69") | 80.9 |
| "Percadox 16N" | 1.1 |
| "3M C15" | 18 |
| FORMULA II | |
| EPON 828 | 54.5 |
| Haloxy 62 | 7.5 |
| Der 732 | 6.1 |
| Expancel 5551DU | 2.0 |
| SG Micros | 8.8 |
| 3M K20 | 17.7 |
| DI-CY | 3.4 |
| FORMULA III | |
| Polyester Resin ("ARISTECH 13031") | 48.8 |
| "Percadox 16N" | 0.7 |
| "SG Micros" (PA IND) | 50.5 |

Figure 7:
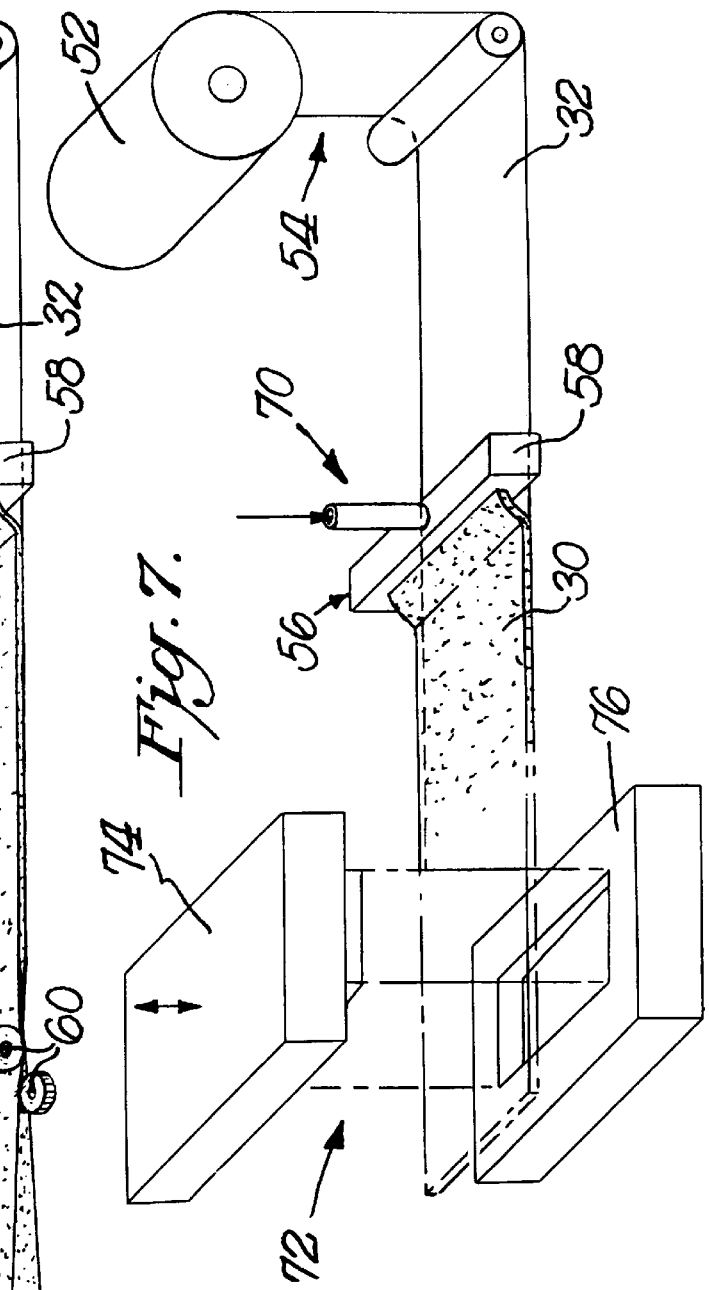
FIG. 7 is a view similar to FIG. 6 of an alternate assembly.

My co-pending application Ser. No. 09/236,917, filed Jan. 25, 1999, entitled Reinforced Structural Assembly discloses various types of stiffeners which are in the form of a carrier layer with a layer of polymer in which preferably, although not necessarily, includes a cover layer. All of the details of what application are incorporated herein by reference thereto. Those various stiffeners for laminated preforms may also be made in addition to the previously described laminate preform in accordance with this invention. FIGS. 6–7 schematically illustrate various inline assemblies for making laminate preforms. As shown in FIG. 6 an line assembly 50 includes a coil 52 which would be ma e of the foil or support member 32 when unwound from the coil at a supply station 54. A layer of polymer 30 is extruded onto foil 32 at extruding station 56 wherein the polymer material would be fed into extrusion die 58 having in opening corresponding to the width of foil 3 as illustrated. A suitable set of forming rollers 60 is provided downstream from the extrusion station 56 at shaping station 62. Rollers 60 bend the laminate so that the cross-section of the resultant laminate is altered from its original flat form to any suitable form such as the C or U-shaped form 64 illustrated in FIG. 6. Where a cover member is to be included in the laminate, the cover member could be rolled on top of the polymer layer 30 such as downstream from the extrusion station 56 and upstream from the shaping station 62.

Figure 7A:
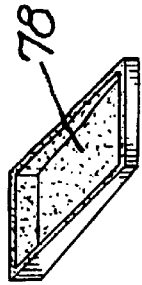
FIG. 7A is a perspective view of the laminate formed by the assembly of FIG. 7.

FIG. 7 illustrates an alternative form of shaping a laminate preform. As shown therein, the assembly 70 includes a coil 52 at supply station 54 which supplies the carrier or foil 32. At extrusion station 56 the polymer layer 30 is extruded directly on foil 32 through extrusion die 58. The shaping of the final laminate preform takes place at a stamping station 72. Stamping station 72 includes a male stamping die 74 positioned over female stamping die 76 to stamp the preform laminate 78 which is illustrated in FIG. 7A. Preferably, a chilled stamping die is used at a temperature of, for example, 0° to –40° F. The chilling assists in the maintaining the part shape. Similarly, in the assembly 50 of FIG. 6 the use of ambient or chilled air in the roll forming process also sets the hard shape. Where the roll forming process of FIG. 6 is used, the cross section is shaped in a continuous manner and then cut to the desired length. Where the stamping die process of FIG. 7 is used the part shape and length is simultaneously formed.

The coincidental forming of the polymer and carrier foil/sheet member at the same time differs from the current process which involves a separate forming of the polymer layer and support sheet and then hand placement of the polymer layer onto the support sheet.

FIGS. 8–10 illustrate variations of laminate preforms that could be made in accordance with this invention. FIG. 8, for example, illustrates an inverted C or U-shaped form 64 having a pair of parallel legs with a generally planar intermediate section. Form 64 comprises a foil carrier 32 with a polymer layer 30 mounted completely around the carrier 32.

FIG. 9 illustrates a variation wherein a pair of laminate preforms 64 is placed in abutting relationship so that the tacky polymer resin layers are secured together to form a generally I-shaped laminate 80 from the two back to back C-sections.

FIG. 10 illustrates a variation where the laminate preform 82 is generally W-shaped having a foil/sheet carrier 32 with an outer polymer layer 30. Other shapes could also be formed.

It is to be understood that while the invention is intended in its preferred practices to use a foil type carrier, the carrier can be of slightly greater thickness and thus be in the nature of a sheet The term "foil" and "sheet" are used in their normal meanings to refer to different thicknesses in that a foil is thinner than a sheet while a sheet is thinner than a plate. In its broadest practice of the invention the carrier may also be of plate thickness.

As should be apparent, the present invention could thus be used to form a wide variety of laminates which would act as effective reinforcement inserts.

What is claimed is:

1. A method of reinforcing a structural member, comprising the steps of:

contacting a planar layer of thermally-expandable structural resin with a planar carrier member to form a two-layer laminated preform;

placing the two-layer laminated preform in contact with a structural channel-defining part such that the two-layer laminated preform covers the channel;

conforming the two-layer preform to the shape of said channel such that the thermally expandable resin portion of said two-layer preform is in contact with said structural channel-defining part; and heating said two-layer aminated preform and said structural channel-defining part to expand said thermally-expandable resin.

2. The method of reinforcing a structural member recited in claim 1, further including the step of trimming away any excess two-layer laminated preform prior to said heating step.

3. The method of reinforcing a structural member recited in claim 1, wherein said structural member is a beam.

4. The method of reinforcing a structural member recited in claim 1, wherein said two-layer preform is formed by extruding a layer of said thermally expandable structural resin on a release liner and then placing said planar carrier member on said thermally expandable structural resin layer.

5. The method of reinforcing a structural member recited in claim 1, wherein said carrier member has a thickness of from about 0.002 to about 0.015 inch.

6. The method of reinforcing a structural member recited in claim 1, wherein s aid thermally-expandable resin has a thickness of from a bout ⅛ inch to about ¼ inch before said heating step and a thickness of from about ⅛ inch to about ½ inch after said heating step.

7. The method of reinforcing a structural member recited in claim 1, wherein said structural member is a metal stamping.

8. The method of reinforcing a structural member recited in claim 1, wherein two of said structural members are formed and then joined together in the shape of a tube.

9. The method of reinforcing a structural member recited in claim 1, wherein said structural foam contains microspheres.

10. The method of reinforcing a structure recited in claim 1, further providing the carrier member with a plurality of open areas comprising the step of perforating said carrier member.

11. The method of reinforcing a structure recited in claim 1, including providing an open mesh member as the carrier member.

12. The method of reinforcing a structure in claim 11, further comprising disposing a closure plate on said structural member closing said channel.

13. A method of reinforcing a part, comprising the steps of:

extruding a layer of thermally expandable resin as a layer on the surface of a release liner;

placing a carrier member on said resin to form a laminate;

die cutting said laminate to a predetermined shape;

placing the laminate on a part having a non-planar geometry;

conforming the laminate to the geometry of the non-planar part;

and thermally expanding and bonding the resin to the non-planar part.

14. A method of reinforcing a part having a non-planar wall, comprising the steps of forming a reinforcing preform laminate by applying an unexpanded uncured foam forming resin layer to a carrier wherein the preform laminate has a shape which conforms to the non-planar wall, inserting the reinforcing preform laminate against the part with the foam layer disposed toward the non-planar wall between the carrier and the wall, and curing and expanding the resin layer into bonding contact with the wall to form a structural foam which adds stiffness and strength to the part.

15. The method of reinforcing a part recited in claim 14, wherein the resin layer is heated to cure and expand the resin layer.

16. The method of reinforcing a part recited in claim 15, wherein the part is a vehicle part, and the reinforcing preform laminate is inserted as part of an assembly line operation.

17. The method of reinforcing a part recited in claim 16 wherein the resin layer is heated in a paint oven.

18. The method of reinforcing a part recited in claim 14, wherein the reinforcing preform laminate forms a lining of uniform thickness after the resin layer has been expanded.

19. The method of reinforcing a part recited in claim 14, wherein the non-planar wall is a channel having a closed end opposite an open end, and the reinforcing preform laminate is inserted into the part against the closed end.

20. The method of reinforcing a part recited in claim 19, including the step of mounting a closure plate across the open end to enclose the channel.

21. The method of reinforcing a part recited in claim 14, wherein the part is a vehicle part, and the reinforcing preform laminate is inserted into the part before the part is placed in a paint oven.

22. The method of reinforcing a part as recited in claim 14, including extruding the foam forming resin into a layer which is mounted into bonding contact with the carrier.

23. The method of reinforcing a part as recited in claim 22, including die cutting the reinforcing preform laminate into shape by a stamping die assembly.

24. The method of reinforcing a part as recited in claim 23, including chilling the stamping die assembly to set the laminate shape.

25. The method of reinforcing a part as recited in claim 22, including forming the preform to its non-planar shape by sets of forming rollers.

26. A method of forming reinforcement laminate preform in an in-line assembly comprising unwinding a layer of material from a coil at an unwinding station to form a carrier, extruding an expandable uncured foam forming resin onto and across the carrier through an extrusion die downstream from the unwinding station to form a laminate preform having a planar shape, forming the laminate preform into a non-planar shape at a form shaping station downstream from the extrusion die, and setting the non-planar shape of the laminate preform.

27. The method of claim 26, wherein the planar laminate preform is shaped into a non-planar shape by a die stamping assembly.

28. The method of claim 27, wherein the non-planar shape is set by chilling the die stamping assembly.

29. The method of claim 26, wherein the planar laminate preform is shaped into a non-planar shape by sets of forming rollers in a roll forming step.

30. The method of claim 29, wherein the non-planar shape of the laminate preform is set by applying ambient or chilled air in the roll forming step.

31. The method of claim 26, wherein a heat expandable foam forming resin is extruded on the carrier.

32. The method of claim 26, including the step of rolling a cover layer on top of the resin before the shaping step to form a trilaminate preform.

33. The method of claim 26, wherein the non-planar shape is a C-shape formed by a pair of generally parallel legs with a generally planar intermediate section, and including the step of securing two C-sections in back to back relationship with the foam forming resin of each C-section at the intermediate portions being secured together so that the resultant shape is of generally I-shape.

34. The method of claim 26, wherein the non-planar shape is of generally a W-shape.

35. The method of claim 26, wherein the non-planar shape is generally a U or C-shape having a pair of legs interconnected by an intermediate section.

* * * * *

UNITED STATES PATENT AND TRADEMARK OFFICE
CERTIFICATE OF CORRECTION

PATENT NO.    : 6,270,600 B1
DATED         : August 7, 2001
INVENTOR(S)   : Wycech It is certified that error appears in the above-identified patent and that said Letters Patent is hereby corrected as shown below:

<u>Column 8,</u>
Line 20, delete "aminated", and insert therefor -- laminated --.
Line 38, delete "s aid", and insert therefor -- said --.
Line 39, delete "a bout", and insert therefor -- about --.

Signed and Sealed this

Eighth Day of April, 2003

JAMES E. ROGAN
*Director of the United States Patent and Trademark Office*